(12) United States Patent
Donovan et al.

(10) Patent No.: US 12,490,914 B1
(45) Date of Patent: Dec. 9, 2025

(54) MEDICAL-DEVICE VISUALIZATION SYSTEMS AND METHODS UTILIZING PATIENT-BASED REFERENCE FRAMING FOR SHAPE SENSING

(71) Applicant: Bard Access Systems, Inc., Salt Lake City, UT (US)

(72) Inventors: Matthew Christopher Jon Donovan, Tempe, AZ (US); Lindsey Michelle King, Sacramento, CA (US)

(73) Assignee: Bard Access Systems, Inc., Salt Lake City, UT (US)

( * ) Notice: Subject to any disclaimer, the term of this patent is extended or adjusted under 35 U.S.C. 154(b) by 0 days.

(21) Appl. No.: 18/809,008

(22) Filed: Aug. 19, 2024

(51) Int. Cl.
*A61B 5/00* (2006.01)
*A61B 5/06* (2006.01)
*A61B 34/10* (2016.01)
*A61B 90/00* (2016.01)

(52) U.S. Cl.
CPC .............. *A61B 5/062* (2013.01); *A61B 5/066* (2013.01); *A61B 5/6823* (2013.01); *A61B 5/6847* (2013.01); *A61B 5/743* (2013.01); *A61B 5/744* (2013.01); *A61B 34/10* (2016.02); *A61B 90/08* (2016.02); *A61B 2034/105* (2016.02); *A61B 2090/0807* (2016.02); *A61B 2560/0462* (2013.01); *A61B 2562/0223* (2013.01); *A61B 2562/0233* (2013.01)

(58) Field of Classification Search
CPC ...................................... A61B 5/062
See application file for complete search history.

(56) References Cited

U.S. PATENT DOCUMENTS

| | | | |
|---|---|---|---|
| 8,388,541 B2 | 3/2013 | Messerly et al. |
| 8,781,555 B2 | 7/2014 | Burnside et al. |
| 8,849,382 B2 | 9/2014 | Cox et al. |
| 9,636,031 B2 | 5/2017 | Cox |
| 9,649,048 B2 | 5/2017 | Cox et al. |

OTHER PUBLICATIONS

Li, M., Tang, Y. and Yao, J., 2018. Photoacoustic tomography of blood oxygenation: a mini review. Photoacoustics, 10, pp. 65-73.
Xia, J., Yao, J. and Wang, L.V., 2014. Photoacoustic tomography: principles and advances. Electromagnetic waves (Cambridge, Mass.), 147, p. 1.).
Zhou, Y., Yao, J. and Wang, L.V., 2016. Tutorial on photoacoustic tomography. Journal of biomedical optics, 21(6), pp. 061007-061007.

*Primary Examiner* — Joseph M Santos Rodriguez
(74) *Attorney, Agent, or Firm* — Rutan & Tucker LLP (57) ABSTRACT

Medical-device visualization systems and methods utilize patient-based reference framing to improve shape sensing for elongate medical devices. A medical-device visualization system includes, in some embodiments, a stylet, patient-wearable sensors, and a console. The stylet includes an optical fiber and a field generator. Each of the patient-wearable sensors senses a field generated by the field generator. The console instantiates medical-device visualization processes for visualizing the elongate medical devices by way of at least the stylet. The medical-device visualization processes include a shape-sensing process, a registration process, and a reference-framing process. The shape-sensing process determines a shape of the stylet in real-time from reflected optical signals from the optical fiber. The registration process registers the distal tip of the stylet in real-time at each sensor of the patient-wearable sensors. And the reference-framing process places the stylet with its shape in a patient-based reference frame established by the patient-wearable sensors.

20 Claims, 8 Drawing Sheets

MEDICAL-DEVICE VISUALIZATION SYSTEMS AND METHODS UTILIZING PATIENT-BASED REFERENCE FRAMING FOR SHAPE SENSING

BACKGROUND

Intravascular guidance of medical devices including guidewires, catheters, and the like have typically used fluoroscopic methods for guiding distal tips of such intravascular medical devices through patient vasculatures and determining whether the distal tips are appropriately placed in their target vascular locations. However, the fluoroscopic methods expose patients and their attending clinicians to harmful X-ray radiation. Moreover, the patients can be exposed to potentially harmful contrast media needed for the fluoroscopic methods. For these reasons, at least some current medical research has turned to developing optical systems and methods around fiber-optic shape sensing ("FOSS") for the guidance of the intravascular medical devices. However, without establishing a patient-based reference frame, orientation-type shape-sensing errors can occur distal of torsional strains on an optical fiber used for shape sensing.

Disclosed herein are medical-device visualization systems and methods utilizing patient-based reference framing for shape sensing.

SUMMARY

Disclosed herein is a medical-device visualization system for visualizing an elongate medical device in a body of a patient. The medical-device visualization system includes, in some embodiments, a stylet, a plurality of patient-wearable sensors, and a console. The stylet includes an optical fiber along a length of the stylet and a field generator in at least a distal tip of the stylet. The optical fiber has a plurality of optical-fiber sensors distributed along a length of the optical fiber. Each sensor of the patient-wearable sensors is configured to sense a field generated by the field generator. The console includes electronic components and circuitry including memory and one or more processors. The memory includes executable instructions configured to instantiate medical-device visualization processes upon execution by the processor(s) for visualizing the elongate medical device by way of the stylet disposed therein as the elongate medical device is advanced through a vasculature of the patient. The medical-device visualization processes include a shape-sensing process, a registration process, and a reference-framing process. The shape-sensing process utilizes shape-sensing logic for determining a shape of the stylet in real-time from reflected optical signals reflected by the optical sensors. The registration process utilizes registration logic for registering the distal tip of the stylet in real-time at each sensor of the patient-wearable sensors. The reference-framing process utilizes reference-framing logic for placing the stylet with its shape in a patient-based reference frame established by the patient-wearable sensors.

In some embodiments, the medical-device visualization system further includes a display. The medical-device visualization processes further include a medical-device displaying process that utilizes medical-device displaying logic to display a medical-device representation of the elongate medical device within a patient avatar as the elongate medical device is advanced through the vasculature of the patient.

In some embodiments, the patient avatar represents a superior portion of the patient viewed from an anterior of the patient or a superior end of the patient for visualizing how far or deep the elongate medical device has advanced into the vasculature of the patient.

In some embodiments, the medical-device displaying process further displays patient-wearable-sensor icons over the patient avatar in accordance with the patient-wearable sensors as placed on the patient. The medical-device representation of the elongate medical device is further displayed in relation to patient-wearable-sensor icons.

In some embodiments, the medical-device visualization system further includes an optical interrogator. The medical-device visualization processes further include an optical-fiber interrogation process that utilizes optical-fiber interrogation logic for sending input optical signals from the optical interrogator into the optical fiber and receiving by the optical interrogator the reflected optical signals reflected by the optical sensors.

In some embodiments, the registration process of registering the distal tip of the stylet at each sensor of the patient-wearable sensors includes triangulating the distal tip of the stylet with pairs of the patient-wearable sensors as the elongate medical device is advanced through the vasculature of the patient.

In some embodiments, triangulating the distal tip of the stylet with the pairs of the patient-wearable sensors as the elongate medical device is advanced through the vasculature of the patient corrects orientation-type shape-sensing errors that might otherwise occur distal of torsional strains on the optical fiber.

In some embodiments, the patient-wearable sensors are configured for placement at primary anatomic reference points selected from at least an access point of the elongate medical device, a subclavian-vessel point, and a sternal-notch point for proper reference framing and contextualization in accordance with the reference-framing process.

In some embodiments, the patient-wearable sensors and the field generator in the distal tip of the stylet are magnetic registration elements for the registration process. The field generator in the distal tip of the stylet is a permanent magnet, and the patient-wearable sensors are magnetic sensors configured to detect the permanent magnet.

In some embodiments, the patient-wearable sensors and the field generator in the distal tip of the stylet are wireless-communication registration elements for the registration process. The field generator in the distal tip of the stylet is a radiofrequency ("RF") signal emitter, and the patient-wearable sensors are at least RF signal receivers configured to detect RF signals from the RF signal emitter.

Also disclosed herein is a method for visualizing an elongate medical device in a body of a patient with a medical-device visualization system. The method includes, in some embodiments, instantiating medical-device visualization processes in a console including electronic components and circuitry including memory and one or more processors ("processor[s]") upon execution of executable instructions stored in the memory by the processor(s). The medical-device visualization processes are for visualizing an elongate medical device by way of a stylet disposed therein as the elongate medical device is advanced through a vasculature of the patient. The medical-device visualization processes include determining a shape of the stylet in accordance with a shape-sensing process that utilizes shape-sensing logic. The shape of the stylet is determined in real-time from reflected optical signals reflected by a plurality of optical sensors distributed along a length of an optical fiber along a length of the stylet. The medical-device visualization processes also include registering a distal tip of the stylet in accordance with a registration process that utilizes registration logic. The distal tip of the stylet is registered in real-time at each sensor of a plurality of patient-wearable sensors configured to sense a field generated by a field generator in at least the distal tip of the stylet. The medical-device visualization processes also include placing the stylet with its shape in a patient-based reference frame in accordance with a reference-framing process that utilizes reference-framing logic. The patient-based reference frame is established by the patient-wearable sensors.

In some embodiments, the medical-device visualization processes also include displaying on a display a medical-device representation of the elongate medical device in accordance with a medical-device displaying process that utilizes medical-device displaying logic. The medical-device representation is advanced within a patient avatar as the elongate medical device is advanced through the vasculature of the patient.

In some embodiments, the patient avatar represents a superior portion of the patient viewed from an anterior of the patient or a superior end of the patient for visualizing how far or deep the elongate medical device has advanced into the vasculature of the patient.

In some embodiments, the medical-device displaying process also includes displaying patient-wearable-sensor icons over the patient avatar in accordance with the patient-wearable sensors as placed on the patient. The medical-device representation of the elongate medical device is further displayed in relation to patient-wearable-sensor icons.

In some embodiments, the medical-device visualization processes also include sending input optical signals from an optical interrogator into the optical fiber and receiving by the optical interrogator the reflected optical signals reflected by the optical sensors in accordance with an optical-fiber interrogation process that utilizes optical-fiber interrogation logic.

In some embodiments, the registration process also includes triangulating the distal tip of the stylet with pairs of the patient-wearable sensors as the elongate medical device is advanced through the vasculature of the patient.

In some embodiments, triangulating the distal tip of the stylet with the pairs of the patient-wearable sensors as the elongate medical device is advanced through the vasculature of the patient corrects orientation-type shape-sensing errors that might otherwise occur distal of torsional strains on the optical fiber.

In some embodiments, the patient-wearable sensors are configured for placement at primary anatomic reference points selected from at least an access point of the elongate medical device, a subclavian-vessel point, and a sternal-notch point for proper reference framing and contextualization in accordance with the reference-framing process.

In some embodiments, the patient-wearable sensors and the field generator in the distal tip of the stylet are magnetic registration elements for the registration process. The field generator in the distal tip of the stylet is a permanent magnet, and the patient-wearable sensors are magnetic sensors configured to detect the permanent magnet in the registration process.

In some embodiments, the patient-wearable sensors and the field generator in the distal tip of the stylet are wireless-communication registration elements for the registration process. The field generator in the distal tip of the stylet is a radiofrequency ("RF") signal emitter, and the patient-wearable sensors are at least RF signal receivers configured to detect RF signals from the RF signal emitter in the registration process.

These and other features of the concepts provided herein will become more apparent to those of skill in the art in view of the accompanying drawings and following description, which describe particular embodiments of such concepts in greater detail.

DESCRIPTION

Before some particular embodiments are disclosed in greater detail, it should be understood that the particular embodiments disclosed herein do not limit the scope of the concepts provided herein. It should also be understood that a particular embodiment disclosed herein can have features that can be readily separated from the particular embodiment and optionally combined with or substituted for features of any of a number of other embodiments disclosed herein.

Regarding terms used herein, it should also be understood the terms are for the purpose of describing some particular embodiments, and the terms do not limit the scope of the concepts provided herein. Ordinal numbers (e.g., first, second, third, etc.) are generally used to distinguish or identify different features or steps in a group of features or steps, and do not supply a serial or numerical limitation. For example, "first," "second," and "third" features or steps need not necessarily appear in that order, and the particular embodiments including such features or steps need not necessarily be limited to the three features or steps. In addition, any of the foregoing features or steps can, in turn, further include one or more features or steps unless indicated otherwise. Labels such as "left," "right," "top," "bottom," "front," "back," and the like are used for convenience and are not intended to imply, for example, any particular fixed location, orientation, or direction. Instead, such labels are used to reflect, for example, relative location, orientation, or directions. Singular forms of "a," "an," and "the" include plural references unless the context clearly dictates otherwise.

"Proximal" is used to indicate a portion, section, piece, element, or the like of a medical device intended to be near or relatively nearer to a clinician when the medical device is used on a patient. For example, a "proximal portion" or "proximal section" of the medical device includes a portion or section of the medical device intended to be near the clinician when the medical device is used on the patient. Likewise, a "proximal length" of the medical device includes a length of the medical device intended to be near the clinician when the medical device is used on the patient. A "proximal end" of the medical device is an end of the medical device intended to be near the clinician when the medical device is used on the patient. The proximal portion, the proximal section, or the proximal length of the medical device need not include the proximal end of the medical device. Indeed, the proximal portion, the proximal section, or the proximal length of the medical device can be short of the proximal end of the medical device. However, the proximal portion, the proximal section, or the proximal length of the medical device can include the proximal end of the medical device. Should context not suggest the proximal portion, the proximal section, or the proximal length of the medical device includes the proximal end of the medical device, or if it is deemed expedient in the following description, "proximal portion," "proximal section," or "proximal length" can be modified to indicate such a portion, section, or length includes an end portion, an end section, or an end length of the medical device for a "proximal end portion," a "proximal end section," or a "proximal end length" of the medical device, respectively.

"Distal" is used to indicate a portion, section, piece, element, or the like of a medical device intended to be near, relatively nearer, or even in a patient when the medical device is used on the patient. For example, a "distal portion" or "distal section" of the medical device includes a portion or section of the medical device intended to be near, relatively nearer, or even in the patient when the medical device is used on the patient. Likewise, a "distal length" of the medical device includes a length of the medical device intended to be near, relatively nearer, or even in the patient when the medical device is used on the patient. A "distal end" of the medical device is an end of the medical device intended to be near, relatively nearer, or even in the patient when the medical device is used on the patient. The distal portion, the distal section, or the distal length of the medical device need not include the distal end of the medical device. Indeed, the distal portion, the distal section, or the distal length of the medical device can be short of the distal end of the medical device. However, the distal portion, the distal section, or the distal length of the medical device can include the distal end of the medical device. Should context not suggest the distal portion, the distal section, or the distal length of the medical device includes the distal end of the medical device, or if it is deemed expedient in the following description, "distal portion," "distal section," or "distal length" can be modified to indicate such a portion, section, or length includes an end portion, an end section, or an end length of the medical device for a "distal end portion," a "distal end section," or a "distal end length" of the medical device, respectively.

"Location" is used to indicate a location of an elongate medical device, the stylet disposed therein, or the optical fiber thereof in some spatial or coordinate reference system such as the patient-based reference frame disclosed herein. Reference points for locating the elongate medical device in the patient-based reference frame are provided by at least the patient-wearable sensors.

Figure 5:
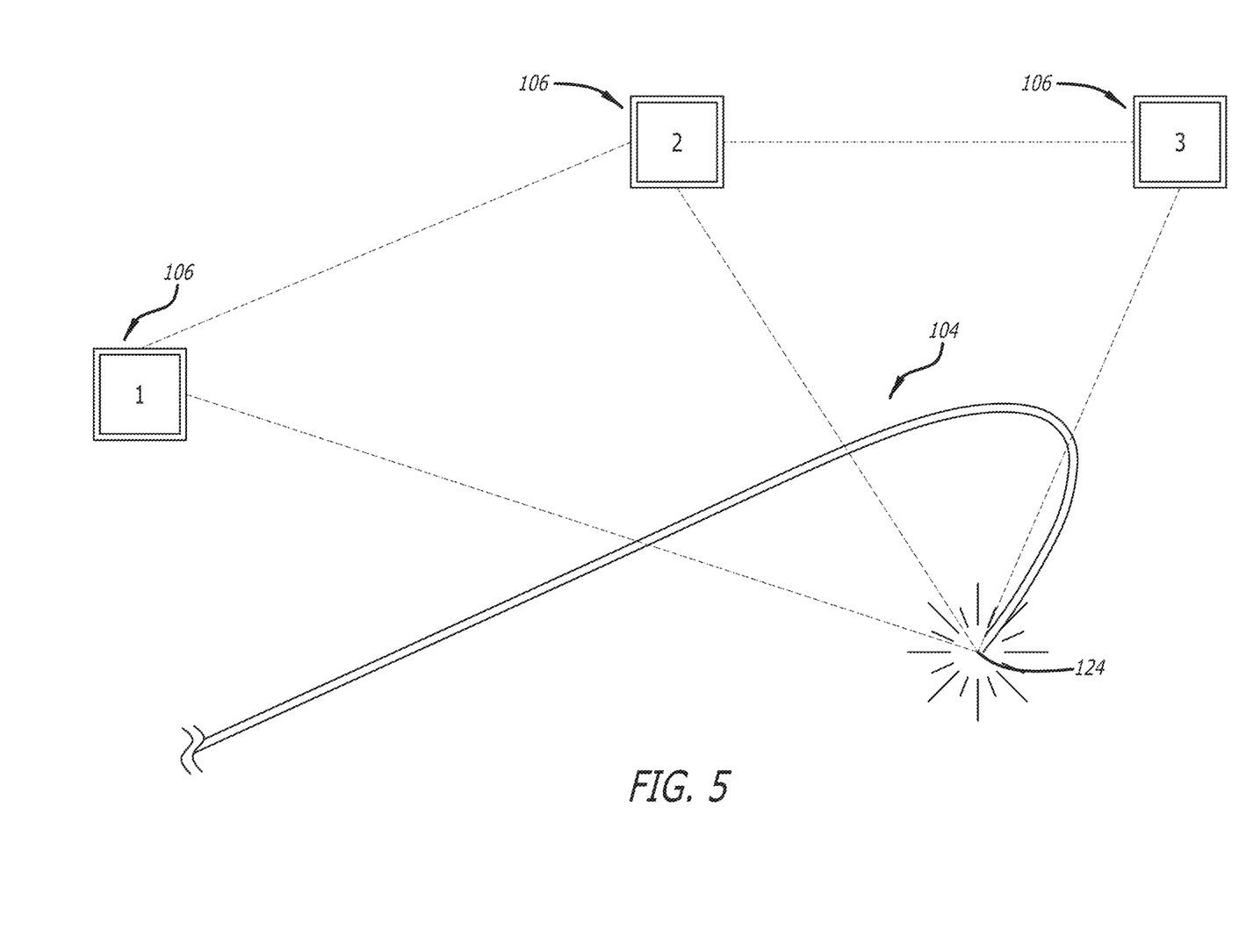
FIG. 5 illustrates triangulation among a distal tip of the stylet and pairs of the patient-wearable sensors in accordance with some embodiments.

"Shape" is used to indicate a plain shape of an elongate medical device, the stylet disposed therein, or the optical fiber thereof in its location. By way of example, the shape of the stylet graphically represented in FIG. 5 is a 'J' shape.

Figure 3:
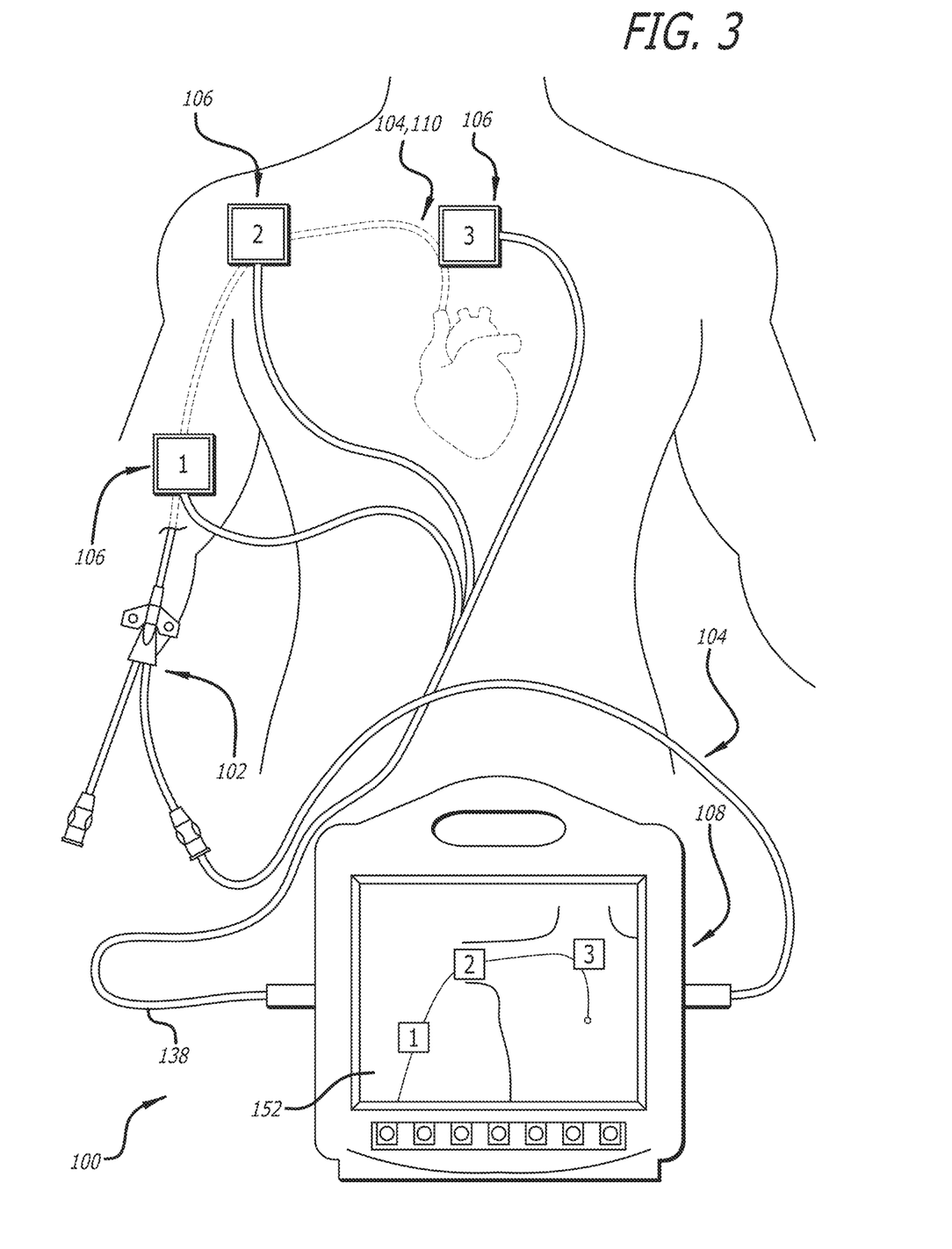
FIG. 3 illustrates the medical-device visualization system in use on a patient for placing an elongate medical device including the stylet disposed therein in accordance with some embodiments.

"Orientation" is used to indicate an orientation of an elongate medical device, the stylet disposed therein, or the optical fiber thereof in its location. By way of example, a distal tip of the elongate medical device graphically represented within the patient-based reference frame in FIG. 3 is in the superior vena cava with an orientation toward the right atrium of the heart.

Figure 6:
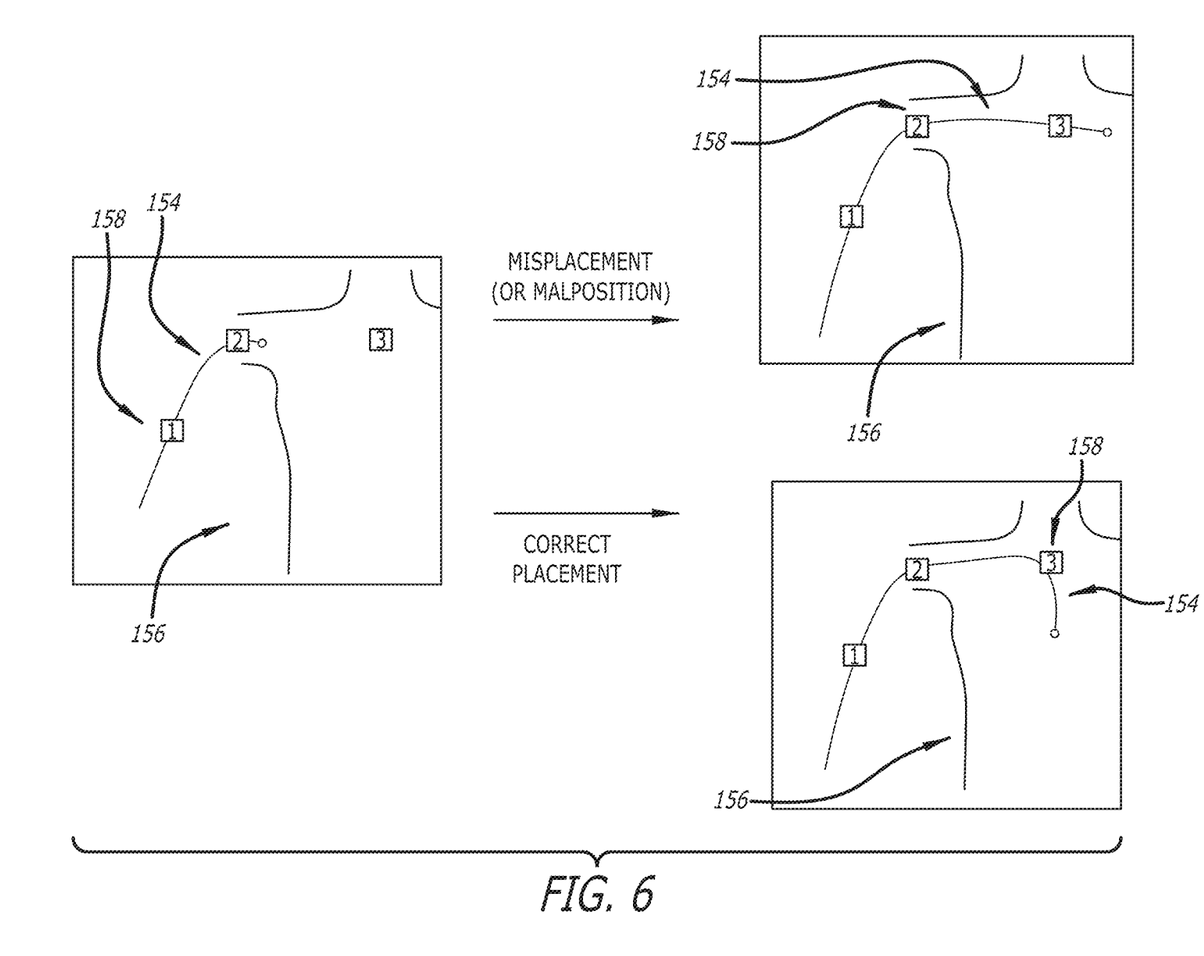
FIG. 6 illustrates advancement of the elongate medical device including the stylet on a display of the medical-device visualization system by way of a medical-device representation within a patient avatar among patient-wearable-sensor icons of the patient-wearable sensors used to establish a patient-based reference frame in accordance with some embodiments.

When used, "position" combines one or more aspects of the shape or orientation of an elongate medical device, the stylet disposed therein, or the optical fiber thereof in its location. By way of example, at least a distal portion of the elongate medical device can be in malposition when the distal portion of the elongate medical device is folded over itself such that a distal tip of the elongate medical device is oriented away from the heart. While "malposition" is sometimes used to indicate misplacement of an elongate medical device such as an over-advanced or over-inserted elongate medical device as shown in FIG. 6, "misplacement" is used herein to indicate over-advancement, under-advancement, or the like of an elongate medical device, thereby differentiating misplacement from malposition.

"Logic" can be hardware, firmware, or software configured to perform one or more functions. As hardware, logic can include circuitry having data processing functionality, data storage functionality, or both. An example of such circuitry can include, but is not limited to, a hardware processor (e.g., a microprocessor, one or more processor cores, a digital-signal processor ["DSP"], a programmable gate array ["PGA"], a microcontroller, an application-specific integrated circuit ["ASIC"], etc.) or semiconductor memory. As firmware, the logic can be stored in persistent storage. As software, logic can include one or more processes, instances, Application Programming Interfaces ("APIs"), subroutines, functions, applets, servlets, or routines. Logic can also include source code, object code, a shared library, a dynamic link library ("DLL"), or even one or more instructions. Such software can be stored in any type of suitable non-transitory storage medium or transitory storage medium (e.g., electrical, optical, acoustical, or any other form of propagated signal including carrier waves, infrared signals, or digital signals). An example of a non-transitory storage medium can include, but is not limited to, a programmable circuit; non-persistent storage such as volatile memory (e.g., any type of random-access memory ["RAM"]); or persistent storage such as non-volatile memory (e.g., read-only memory ["ROM"], power-backed RAM, flash memory, phase-change memory, etc.), a solid-state drive, a hard-disk drive, an optical-disc drive, or a portable memory device.

Unless defined otherwise, all technical and scientific terms used herein have the same meaning as commonly understood by those of ordinary skill in the art.

As set forth above, at least some current medical research has turned to developing optical systems and methods around FOSS for the guidance of intravascular medical devices. However, without establishing a patient-based reference frame, orientation-type shape-sensing errors can occur distal of torsional strains on an optical fiber used for shape sensing. Indeed, when a torsional strain occurs, it can be interpreted as a bend in the optical fiber that effectively reorients the optical fiber distal of the torsional strain.

Disclosed herein are medical-device visualization systems and methods utilizing patient-based reference framing for addressing at least torsional strains in optical fibers while shape sensing.

Medical-Device Visualization System

Figure 1:
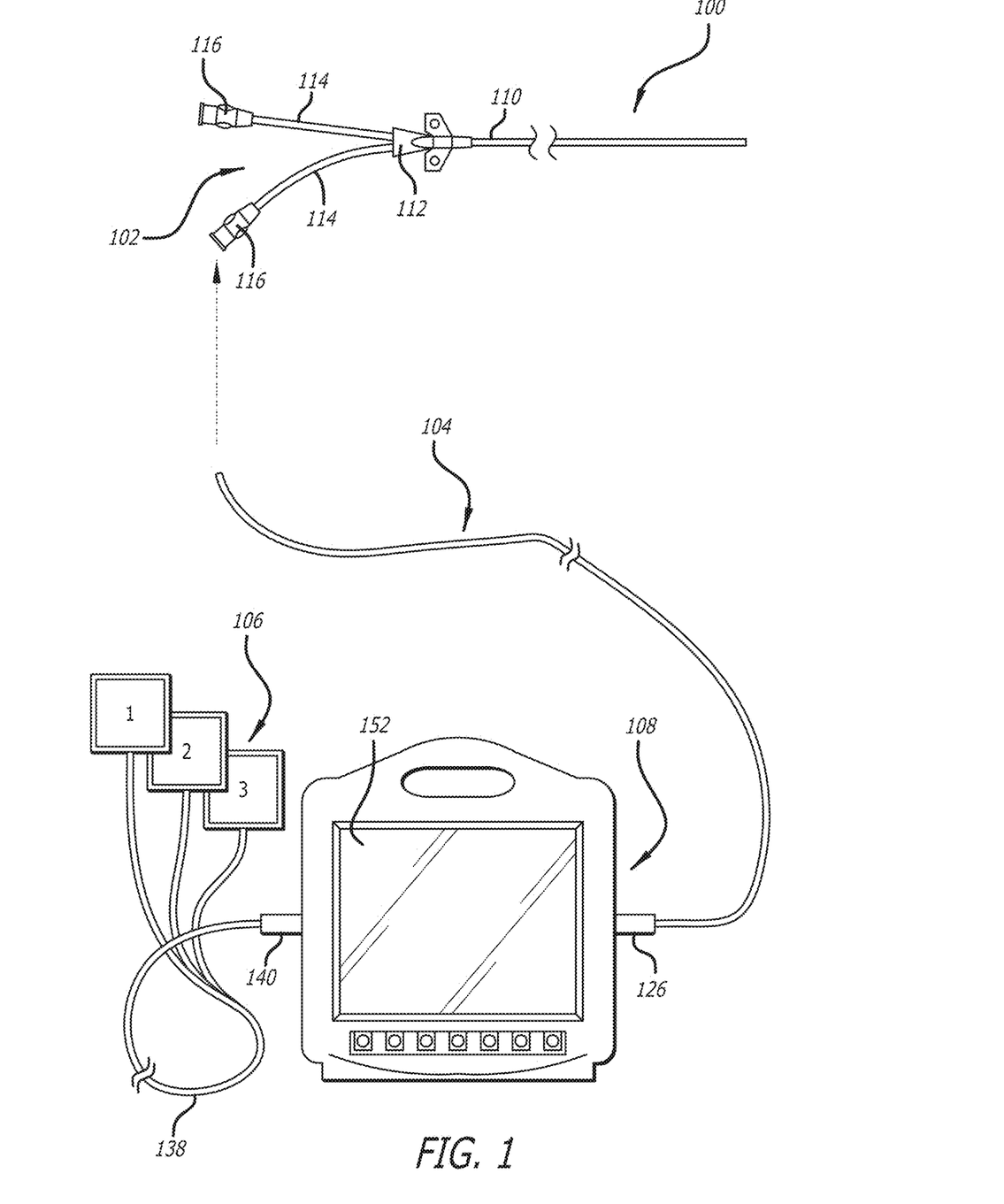
FIG. 1 illustrates a medical-device visualization system including a stylet, a plurality of patient-wearable sensors, and a console in accordance with some embodiments.
Figure 2:
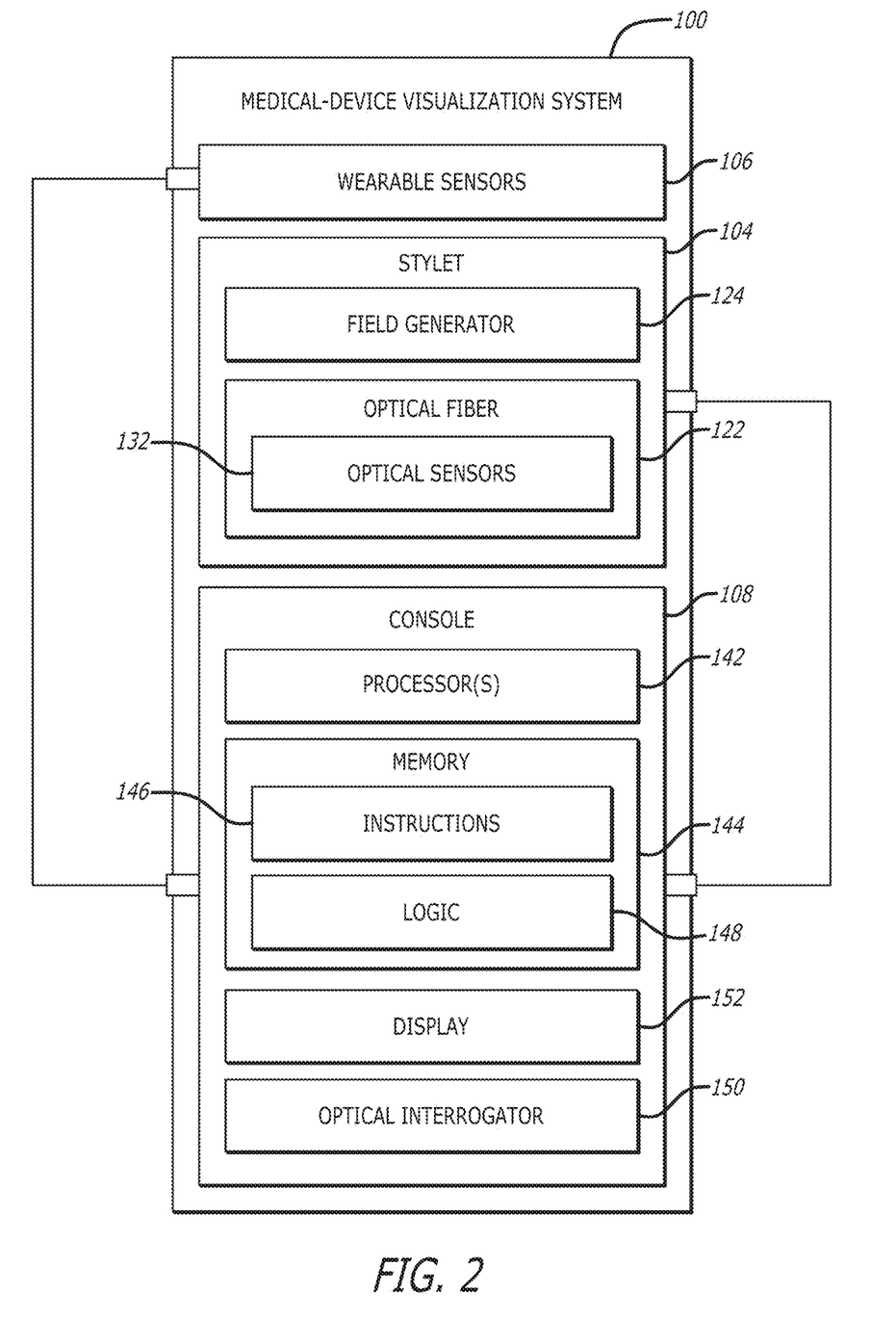
FIG. 2 illustrates a block diagram of the medical-device visualization system in accordance with some embodiments.

FIG. 1 illustrates a medical-device visualization system 100 in accordance with some embodiments, and FIG. 2 illustrates a block diagram of the medical-device visualization system 100 in accordance with some embodiments. FIG. 3 illustrates the medical-device visualization system 100 in use on a patient for placing an elongate medical device 102 in accordance with some embodiments.

The medical-device visualization system 100 is configured for visualizing the elongate medical device 102 in a body of a patient. Thus, the medical-device visualization system 100 can include a stylet 104, a plurality of patient-wearable sensors 106, a console 108, and, optionally, the elongate medical device 102, itself, particularly in embodiments in which the stylet 104 or the optical fiber 122 is integrated into the elongate medical device 102.

As shown in FIGS. 1 and 3, the elongate medical device 102 can be a peripherally inserted central catheter ("PICC"), but it should be understood the elongate medical device 102 is not limited thereto as the elongate medical device 102 can be any elongate medical device configured for insertion into a body of a patient. When the elongate medical device 102 is the foregoing PICC, as shown, the elongate medical device 102 includes a catheter tube 110, a furcated hub 112 (e.g., a bifurcated hub, a trifurcated hub, etc.), a plurality of extension legs 114 (e.g., two extension legs, three extension legs, etc.), and a plurality of fluid fittings 116 (e.g., two Luer connectors, three Luer connectors, etc.) operably connected in the foregoing order. The catheter tube 110 includes a plurality of catheter-tube lumens (e.g., two catheter-tube lumens, three catheter-tube lumens, etc.) into any one of which the stylet 104 is configured to be disposed. That said, in embodiments in which the stylet 104 or the optical fiber 122 and field generator 124 thereof are integrated into the elongate medical device 102, it is integrated into a longitudinal bead of the catheter tube 110 such as along a septum or catheter-tube wall of the catheter tube 110. The furcated hub 112 has a plurality of hub lumens (e.g., two hub lumens, three hub lumens, etc.) correspondingly fluidly connected to the catheter-tube lumens. Each extension leg of the extension legs 114 has an extension-leg lumen fluidly connected to a hub lumen of the foregoing hub lumens. Notably, in embodiments in which the stylet 104 or the optical fiber 122 and field generator 124 thereof is integrated into the elongate medical device 102, the elongate medical device 102 can further include an extension tube akin to an extension leg extending from the furcated hub 112, albeit with the stylet 104 or the optical fiber 122 disposed therein. Such an extension tube can terminate in a plug for establishing an optical connection between the optical interrogator 150 and the optical fiber 122, an electrical connection between the console 108 and a plurality of wires substantially coextensive with the optical fiber 122 as set forth below for the stylet 104, or both, particularly when the optical interrogator 150 is integrated into the console 108 as shown in FIGS. 1 and 2. Such an electrical connection is beneficial when the field generator 124 integrated in the distal tip of the elongate device is powered.

Figure 4:
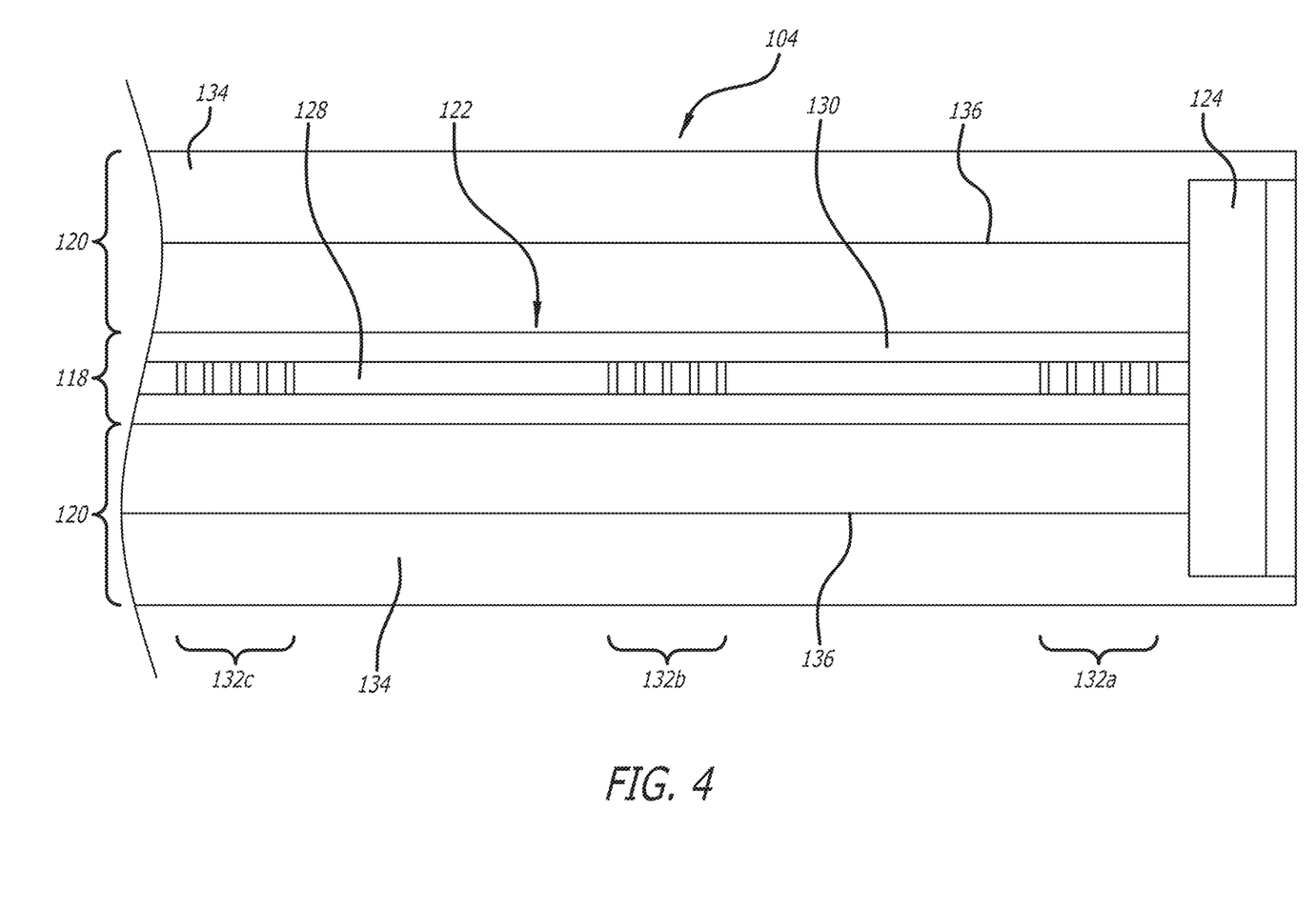
FIG. 4 illustrates a longitudinal cross section of a distal end portion of a stylet of the medical-device visualization system in accordance with some embodiments.

FIG. 4 illustrates a longitudinal cross section of a distal end portion of the stylet 104 of the medical-device visualization system 100 in accordance with some embodiments.

As shown, the stylet 104 can include an inner construction 118 and an outer construction 120 over the inner construction 118 encasing the inner construction 118 therein. In addition, such a stylet 104 includes an optical fiber 122 along a length of the stylet 104 and a field generator 124 in at least a distal tip of the stylet 104. Lastly, the stylet 104 can terminate in a plug 126 for establishing an optical connection between the optical interrogator 150 and the optical fiber 122, an electrical connection between the console 108 and the metal wires 136 substantially coextensive with the optical fiber 122 as set forth below, or both, particularly when the optical interrogator 150 is integrated into the console 108 as shown in FIGS. 1 and 2. Such an electrical connection is beneficial when the field generator 124 in the distal tip of the stylet 104 is powered.

The inner construction 118 of the stylet 104 can include one or more optical-fiber cores 128 for the optical fiber 122, wherein the one-or-more optical-fiber cores 128 are disposed in a cladding 130. Each optical-fiber core of the one-or-more optical-fiber cores 128 can have a relatively smaller diameter configured for a single mode of light propagation or a relatively larger diameter configured for multiple modes of light propagation. In an example, the stylet 104 can include a single optical-fiber core for the optical fiber 122, the single optical-fiber core configured for a single mode of light propagation or multiple modes of light propagation. In another example, the stylet 104 can include a plurality of optical-fiber cores such as three, seven, thirteen, nineteen, or more optical-fiber cores for the optical fiber 122, the foregoing cores configured for a single mode of light propagation, multiple modes of light propagation, or a combination of the foregoing modes of light propagation.

Whether the optical fiber 122 includes a single optical-fiber core or a plurality of optical-fiber cores, each optical-fiber core of the one-or-more optical-fiber cores 128 can include a plurality of optical-fiber sensors 132a, 132b, 132c, . . . , 132n distributed along a length of the optical fiber 122 for shape sensing therewith. The optical-fiber sensors 132a, 132b, 132c, . . . , 132n can include variations in refractive index, thereby forming wavelength-specific reflectors of the optical-fiber sensors 132a, 132b, 132c, . . . , 132n configured to reflect input optical signals sent into the stylet 104 or the optical fiber 122 by the optical interrogator 150. FIG. 4 illustrates, in particular, a last three optical-fiber sensors 132a, 132b, and 132c in a distal portion of the stylet 104, which optical-fiber sensors 132a, 132b, and 132c can be particularly useful when determining via the logic 148 whether the stylet 104 or the optical fiber 122 is encountering more tortured vasculature or the like. This is because the last three optical-fiber sensors 132a, 132b, and 132c firstly and directly experience a physical change in curvature of the stylet 104 when encountering the more tortured vasculature or the like.

The outer construction 120 of the stylet 104 can include a mechanical layer 134, which can be tubing over the inner construction 118 of the stylet 104. The tubing can be metal tubing such as tubing of nitinol or stainless steel, or the tubing can be polymer tubing such as tubing of a thermoplastic elastomer, for example, a polyether block amide. Notably, the polymer tubing can include a plurality of wires 136 disposed in the polymer tubing substantially coextensive with the optical fiber 122. The metal wires 136 can be configured to provide additional structural support to the polymer tubing. For example, the metal wires 136 can be braided into a braided sleeve over which the polymer tubing is extruded, wherein the braided sleeve or the metal wires 136 provide the additional structural support to the polymer tubing. The metal wires 136 can additionally or alternatively be configured to convey power, electrical signals, or both over the length of the stylet 104, which is beneficial when the field generator 124 in the distal tip of the stylet 104 is powered. Notably, the metal tubing can be likewise configured to convey power, electrical signals, or both over the length of the stylet 104 to the field generator 124 when the field generator 124 is powered.

The field generator 124 in the distal tip of the stylet 104 can be a magnetic or wireless-communication registration element for the registration process set forth below. When the field generator 124 is a magnetic registration element, the field generator 124 can be a permanent magnet or an electromagnet powered by way of the metal wires 136 or metal tubing set forth above with respect to the outer construction 120 of the stylet 104. When the field generator 124 is a wireless-communication element, the field generator 124 can be a radiofrequency ("RF") signal emitter. Such an RF signal emitter can be a passive RF signal emitter in that the passive RF signal emitter emits an RF signal when electromagnetically induced to do so by one or more of the patient-wearable sensors 106 inductively coupled to the passive RF signal emitter. Alternatively, the RF signal emitter can be an active RF signal emitter in that the active RF signal emitter intermittently or continuously emits an RF signal when powered by way of the metal wires 136 or metal tubing set forth above with respect to the outer construction 120 of the stylet 104.

The patient-wearable sensors 106 can correspondingly be magnetic or wireless-communication registration elements for the registration process set forth below. Indeed, each sensor of the patient-wearable sensors 106 is correspondingly configured to sense a field generated by the field generator 124 in the distal tip of the stylet 104. When the patient-wearable sensors 106 are magnetic registration elements, the patient-wearable sensors 106 can be magnetic sensors configured for detecting magnetic signals from the field generator 124 in the distal tip of the stylet 104, wherein each magnetic sensor is powered and transfers data by way of a cable 138, optionally, combined with other such cables in a so-called breakout or fanout cable, terminating in a plug 140 for establishing an electrical connection to the console 108. When the patient-wearable sensors 106 are wireless-communication elements, the patient-wearable sensors 106 can be RF signal receivers or transceivers configured for detecting RF signals from the field generator 124 in the distal tip of the stylet 104, wherein each magnetic sensor is powered and transfers data by way of the cable 138, optionally, combined with other such cables in the breakout or fanout cable, terminating in the plug 140 for establishing an electrical connection to the console 108.

As best shown in FIG. 3, the patient-wearable sensors 106 are configured for placement at primary anatomic reference points selected from at least an access point of the elongate medical device 102 as shown by the patient-wearable sensor 106 labeled '1,' a subclavian-vessel point as shown by the patient-wearable sensor 106 labeled '2,' and a sternal-notch point as shown by the patient-wearable sensor 106 labeled '3' for proper reference framing and contextualization in accordance with the reference-framing process. Notwithstanding the foregoing, it should be understood that fewer or more patient-wearable sensors 106 can be used than the three patient-wearable sensors 106 shown in FIG. 3 for reference framing and contextualization in accordance with the reference-framing process. In an example, more patient-wearable sensors 106 such as the five patient-wearable sensors 106 shown in FIG. 8 can be used for reference framing and contextualization in accordance with the reference-framing process. However, it should be understood that use of fewer patient-wearable sensors 106 (e.g., less than three patient-wearable sensors 106) can reduce accuracy in the foregoing reference framing and contextualization, and use of more patient-wearable sensors 106 (e.g., more than three patient-wearable sensors 106) can increase processing time for the reference framing and contextualization if the console 108 is inadequately configured with respect its processor(s) 142 and memory 144.

Notably, each patient-wearable sensor of the patient-wearable sensors 106 can be configured with a consumable component and a complementary capital or multiuse component. Such a consumable component can include an adhesive or the like such as a hydrogel that adheres the consumable component of the patient-wearable sensor 106 to the patient. The complementary multiuse component of the patient-wearable sensor 106 can be coupled to the consumable component either before or after it is adhered to the patient, thereby effecting placement of the patient-wearable sensor 106 on the patient. Notwithstanding the foregoing, it should be understood that an entirety of each patient-wearable sensor of the patient-wearable sensors 106 can be consumable with a patient-facing side of such a patient-wearable sensor 106 including the adhesive or the like for adhering the patient-wearable sensor 106 to the patient.

The console 108 includes electronic components and circuitry including one or more processors 142 and memory 144, which memory 144, in turn, is non-transitory computer-readable media that includes executable instructions 146 and, in some embodiments, logic 148 as set forth in more detail below. In addition, the console 108 can include an optical interrogator 150 and a display 152 integrated therein. However, it should be understood that neither the optical interrogator 150 nor the display 152 need to be integrated in the console 108. Indeed, the optical interrogator 150, the display 152, or both the optical interrogator 150 and the display 152 can stand alone in the medical-device visualization system 100 or be integrated into another component of the medical-device visualization system 100. In an example, the optical interrogator 150 can stand alone as a stand-alone optical interrogator configured to operably connect to the console 108, and the display 152 can be integrated in a monitor configured to operably connect to the console 108. Notably, the console 108 can assume any convenient form factor including that of a smart device such as a smartphone or tablet, and, in such embodiments, at least the optical interrogator 150 can be the stand-alone optical interrogator.

The instructions 146 in the memory 144 are configured to instantiate one or more medical-device visualization processes upon execution of the instructions 146 by the processor(s) 142 for visualizing in real-time the elongate medical device 102 as the elongate medical device 102 is advanced through a vasculature of the patient. The medical-device visualization process(es) include(s) at least an optical-fiber interrogation process, a shape-sensing process, a registration process, a reference-framing process, a medical-device displaying process, or some combination of the foregoing enumerated process. Notably, as set forth above, the stylet 104 is either disposed in the elongate medical device 102 or the optical fiber 122 and field generator 124 of the stylet 104 are integrated in the elongate medical device 102, thereby enabling visualization of the elongate medical device 102 in accordance with the medical-device visualization process(es) as the elongate medical device 102 is advanced through the vasculature of the patient.

The optical-fiber interrogation process utilizes optical-fiber interrogation logic for sending input optical signals (e.g., 1460-1620 nm laser light by way of a tunable laser) from the optical interrogator 150 into the optical fiber 122. In addition, the optical-fiber interrogation process utilizes the optical-fiber interrogation logic for receiving optical-sensor reflected optical signals by the optical interrogator 150.

The shape-sensing process utilizes shape-sensing logic for determining a shape of the stylet 104 disposed in the elongate medical device 102 or the elongate medical device 102, itself, from the reflected optical signals reflected by the optical-fiber sensors 132. Notably, the shape-sensing process can further utilize optical-signal-converting logic for converting the optical-sensor reflected optical signals received by the optical interrogator 150 into converted electrical signals for determining with the shape-sensing logic the shape of the stylet 104 disposed in the elongate medical device 102 or the elongate medical device 102, itself. See, e.g., Floris, Ignazio, et al. "Fiber optic shape sensors: A comprehensive review." *Optics and Lasers in Engineering* 139 (2021): 106508, which is incorporated by reference in its entirety into this application for details in determining the shape of the stylet 104 disposed in the elongate medical device 102 or the elongate medical device 102, itself.

FIG. 5 illustrates triangulation among the distal tip of the stylet 104 and pairs of the patient-wearable sensors 106 in accordance with some embodiments.

The registration process utilizes registration logic for registering the field generator 124 in the distal tip of the stylet 104 or the elongate medical device 102, itself, at each sensor of the patient-wearable sensors 106 as the elongate medical device 102 is advanced through the vasculature of the patient. Indeed, as shown, the registration process of registering the field generator 124 in the distal tip of the stylet 104 or the elongate medical device 102 includes triangulating the field generator 124 with pairs of the patient-wearable sensors 106 as the elongate medical device 102 is advanced through the vasculature of the patient. Notably, if a torsional strain occurs in the optical fiber 122 of the stylet 104 or the elongate medical device 102 as the elongate medical device 102 is advanced through the vasculature of the patient, and if such torsional strain is interpreted as a bend in the optical fiber 122, triangulating the field generator 124 with the pairs of the patient-wearable sensors 106 provides tip-location confirmation for the distal tip of the stylet 104 or the elongate medical device 102. Thus, triangulating the field generator 124 with the pairs of the patient-wearable sensors 106 as the elongate medical device 102 is advanced through the vasculature of the patient corrects orientation-type shape-sensing errors that might otherwise occur distal of torsional strains on the optical fiber 122 by way of the tip-location confirmation.

The reference-framing process utilizes reference-framing logic for placing the stylet 104 or the elongate medical device 102, itself, with its shape in a patient-based reference frame established by the patient-wearable sensors 106 as the elongate medical device 102 is advanced through the vasculature of the patient, which advantageously dynamically links the stylet 104 or the elongate medical device 102 and its instantaneous shape to the patient avatar 156 set forth below. Like that set forth above, if a torsional strain occurs in the optical fiber 122 of the stylet 104 or the elongate medical device 102 as the elongate medical device 102 is advanced through the vasculature of the patient, and if such torsional strain is interpreted as a bend in the optical fiber 122, the patient-based reference frame in which the stylet 104 or the elongate medical device 102 is placed limits or constraints the shape of the stylet 104 or the elongate medical device 102 to those shapes possible in the patient-based reference frame. Thus, placing the stylet 104 or the elongate medical device 102 in the patient-based reference frame as the elongate medical device 102 is advanced through the vasculature of the patient corrects orientation-type shape-sensing errors that might otherwise occur distal of torsional strains on the optical fiber 122 by way of the limits or constraints on the shapes possible in the patient-based reference frame.

Figure 7:
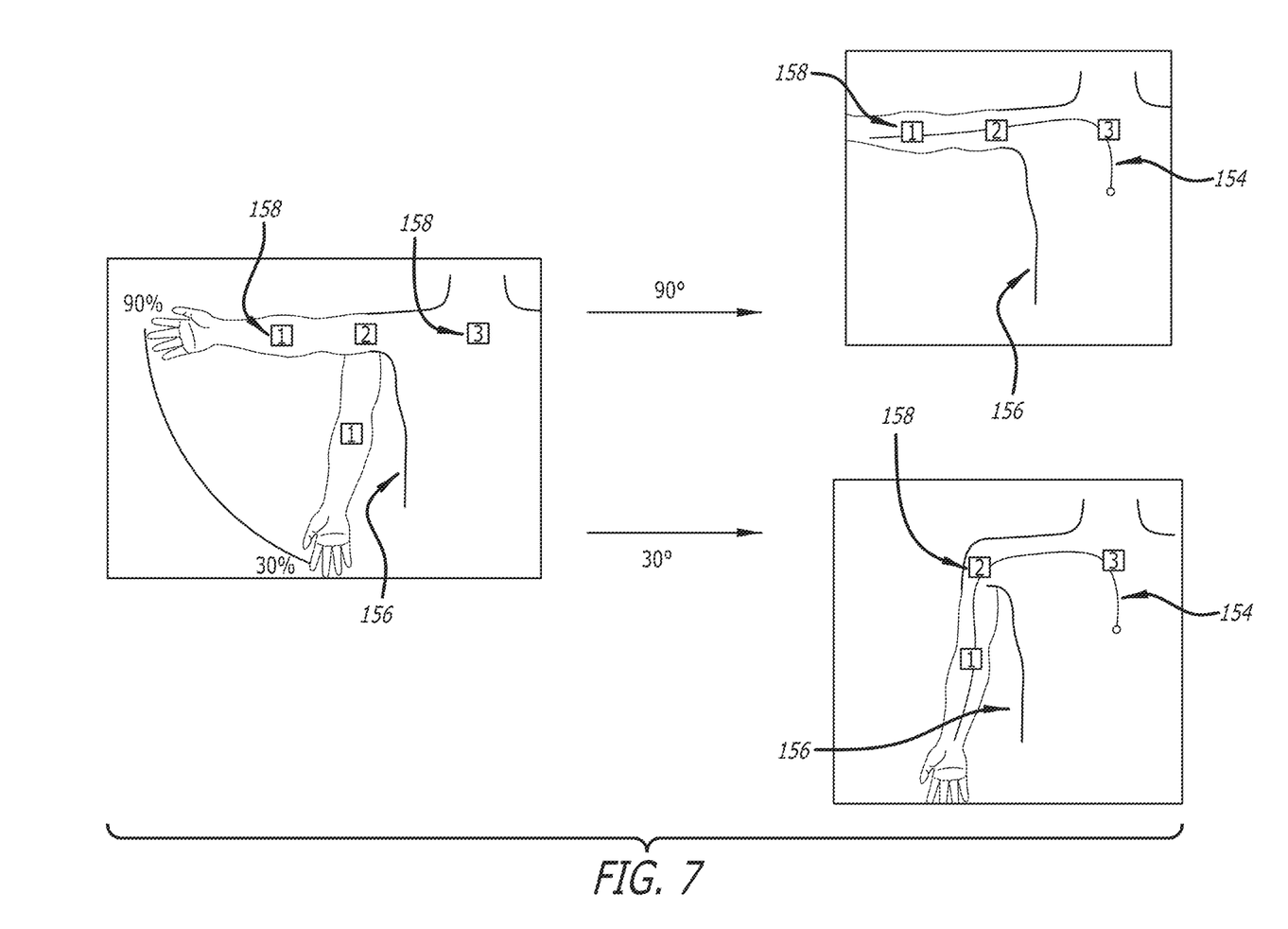
FIG. 7 illustrates an ability of the patient-based reference frame established by the patient-wearable sensors to accommodate different body positions of the patient in accordance with some embodiments.

Advantageously, the patient-based reference frame established by the patient-wearable sensors 106 is dynamic in that it can accommodate different body positions of the patient as shown by way of FIG. 7. Indeed, the very placement of the patient-wearable sensors 106 at the primary anatomic reference points set forth above, which, again, are selected from at least the access point of the elongate medical device 102, the subclavian-vessel point, and the sternal-notch point, establishes the patient-based reference frame in three-dimensional ("3D") space about the patient. Repositioning the patient such as raising or lowering his or her arm as shown in FIG. 7 thusly reestablishes the patient-based reference frame in 3D space about the patient for a dynamic patient-based reference frame.

FIGS. 6-9 illustrate advancement of the elongate medical device 102 including the stylet 104 on the display 152 by way of a medical-device representation 154 within a patient avatar 156 among patient-wearable-sensor icons 158 of the patient-wearable sensors 106 in accordance with some embodiments.

As shown, the medical-device displaying process utilizes medical-device displaying logic to display the patient avatar 156, the patient-wearable-sensor icons 158 of the patient-wearable sensors 106, and the medical-device representation 154 of the stylet 104 or the elongate medical device 102, itself, with its shape within the patient avatar 156 among the patient-wearable-sensor icons 158 as the elongate medical device 102 is advanced through the vasculature of the patient.

Figure 8:
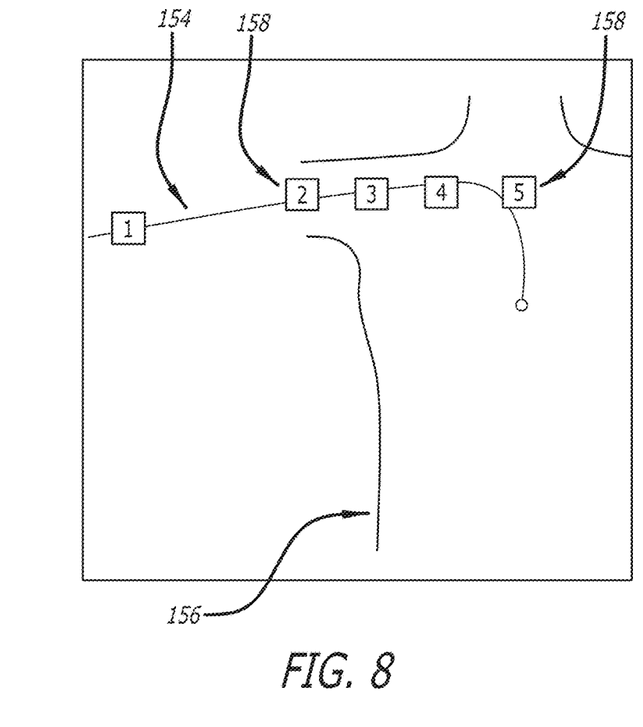
FIG. 8 illustrates the patient avatar representing a superior portion of the patient as viewed from an anterior of the patient, notably with additional patient-wearable-sensor icons corresponding to additional patient-wearable sensors in accordance with some embodiments.
Figure 9:
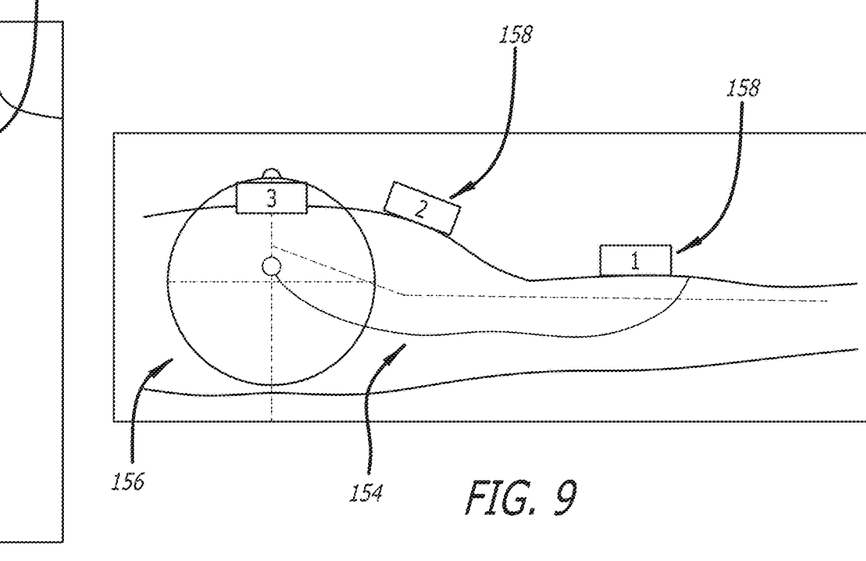
FIG. 9 illustrates the patient avatar representing the superior portion of the patient as viewed from a superior end of the patient in accordance with some embodiments.

Each figure of FIGS. 6-8 shows the patient avatar 156 as a representation of a superior portion of the patient as viewed from an anterior of the patient, and FIG. 9 shows the patient avatar 156 as a representation of the superior portion of the patient as viewed from a superior end of the patient. However, it should be understood that the patient avatar 156 is not limited to the foregoing representations whether by views such as the foregoing anterior and superior-end views or portions such as the foregoing superior portion of the patient. Indeed, the patient avatar 156 can represent any portion of the patient ranging from an inferior portion of the patient to the superior portion of the patient up to an entirety of the patient, and the patient avatar 156 can be provided in any view needed for a femoral central venous catheter, the PICC set forth above, or the like in order to visualize how far or deep the elongate medical device 102 has advanced into the vasculature of the patient.

Each figure of FIGS. 6-9 shows the patient-wearable-sensor icons 158 over the patient avatar 156 in accordance with the patient-wearable sensors 106 as placed on the patient. For example, FIG. 6 shows the patient-wearable-sensor icons 158 over the patient avatar 156 in accordance with the patient-wearable sensors 106 placed at the primary anatomic reference points set forth above, which are selected from at least the access point of the elongate medical device 102, the subclavian-vessel point, and the sternal-notch point. In this way, the patient-wearable-sensor icons 158 correspond to the patient-wearable sensors 106 such that a clinician with reference to the display 152 can reasonably determine on the patient himself or herself how far or deep the elongate medical device 102 has advanced into the vasculature of the patient.

Each figure of FIGS. 6-9 also shows the medical-device representation 154 of the elongate medical device 102 with its shape within the patient avatar 156 among the patient-wearable-sensor icons 158 as the elongate medical device 102 is advanced through the vasculature of the patient. Such a medical-device representation 154 can be a ray or line with a dot for its distal endpoint, the ray or line corresponding to the stylet 104 disposed in the elongate medical device 102 or the elongate medical device 102, itself, and the dot corresponding to the distal end of the stylet 104 or the elongate medical device 102. Notably, the medical-device representation 154 can be dynamically displayed with one or more effects (e.g., coloring, line styling, breathing, glowing, etc.) corresponding to conditions experienced by the stylet 104 disposed in the elongate medical device 102 or the elongate medical device 102, itself. In an example, the medical-device representation 154 can be colored green when advancement of the stylet 104 or the elongate medical device 102 in the vasculature of the patient proceeds normally. However, should any portion of the stylet 104 or the elongate medical device 102 encounter an abnormal condition such as an occlusion that restricts advancement through the vasculature of the patient, at least a corresponding portion of the medical-device representation 154 can be colored red to indicate advancement of the stylet 104 or the elongate medical device 102 in the vasculature of the patient is not proceeding normally.

Methods

Methods include methods of the medical-device visualization system 100, itself, as well as methods of using the medical-device visualization system 100. In an example, a method of the medical-device visualization system 100 can include a method for visualizing the elongate medical device 102 in a body of a patient with the medical-device visualization system 100. Such a method can include instantiating the medical-device visualization process(es) in the console 108 upon execution of the instructions 146 stored in the memory 144 by the processor(s) 142. As set forth above, the medical-device visualization process(es) include(s) at least an optical-fiber interrogation process, a shape-sensing process, a registration process, a reference-framing process, a medical-device displaying process, or some combination of the foregoing enumerated process. The stylet 104 is either disposed in the elongate medical device 102 or the optical fiber 122 and field generator 124 of the stylet 104 are integrated in the elongate medical device 102, the medical-device visualization process(es) thereby enabling visualization of the elongate medical device 102 as the elongate medical device 102 is advanced through a vasculature of the patient.

While some particular embodiments have been disclosed herein, and while the particular embodiments have been disclosed in some detail, it is not the intention for the particular embodiments to limit the scope of the concepts provided herein. Additional adaptations or modifications can appear to those of ordinary skill in the art, and, in broader aspects, these adaptations or modifications are encompassed as well. Accordingly, departures may be made from the particular embodiments disclosed herein without departing from the scope of the concepts provided herein.

What is claimed is:

1. A medical-device visualization system for visualizing an elongate medical device in a body of a patient, comprising:
   a stylet including:
      an optical fiber along a length of the stylet, the optical fiber having a plurality of optical-fiber sensors distributed along a length of the optical fiber; and
      a field generator in at least a distal tip of the stylet;
   a plurality of patient-wearable sensors, each sensor of the plurality of patient-wearable sensors configured to sense a field generated by the field generator; and
   a console with electronic components and circuitry including memory and one or more processors, the memory including executable instructions configured to instantiate medical-device visualization processes upon execution by the one or more processors for visualizing the elongate medical device by way of the stylet disposed therein as the elongate medical device is advanced through a vasculature of the patient, and the medical-device visualization processes including:
      a shape-sensing process that utilizes shape-sensing logic for determining a shape of the stylet in real-time from reflected optical signals reflected by the plurality of optical-fiber sensors;
      a registration process that utilizes registration logic for registering the distal tip of the stylet in real-time at each sensor of the plurality of patient-wearable sensors; and
      a reference-framing process that utilizes reference-framing logic for placing the stylet with its shape in a patient-based reference frame established by the plurality of patient-wearable sensors.

2. The medical-device visualization system of claim 1, further comprising a display, the medical-device visualization processes further including a medical-device displaying process that utilizes medical-device displaying logic to display a medical-device representation of the elongate medical device within a patient avatar as the elongate medical device is advanced through the vasculature of the patient.

3. The medical-device visualization system of claim 2, wherein the patient avatar represents a superior portion of the patient viewed from an anterior of the patient or a superior end of the patient for visualizing how far or deep the elongate medical device has advanced into the vasculature of the patient.

4. The medical-device visualization system of claim 2, wherein the medical-device displaying process further displays patient-wearable-sensor icons over the patient avatar in accordance with the plurality of patient-wearable sensors as placed on the patient, the medical-device representation of the elongate medical device further displayed in relation to the patient-wearable-sensor icons.

5. The medical-device visualization system of claim 1, further comprising an optical interrogator, the medical-device visualization processes further including an optical-fiber interrogation process that utilizes optical-fiber interrogation logic for sending input optical signals from the optical interrogator into the optical fiber and receiving by the optical interrogator the reflected optical signals reflected by the plurality of optical-fiber sensors.

6. The medical-device visualization system of claim 1, wherein the registration process of registering the distal tip of the stylet at each sensor of the plurality of patient-wearable sensors includes triangulating the distal tip of the stylet with pairs of the plurality of patient-wearable sensors as the elongate medical device is advanced through the vasculature of the patient.

7. The medical-device visualization system of claim 6, wherein triangulating the distal tip of the stylet with the pairs of the plurality of patient-wearable sensors as the elongate medical device is advanced through the vasculature of the patient corrects orientation-type shape-sensing errors that might otherwise occur distal of torsional strains on the optical fiber.

8. The medical-device visualization system of claim 1, wherein the plurality of patient-wearable sensors are configured for placement at primary anatomic reference points selected from at least an access point of the elongate medical device, a subclavian-vessel point, and a sternal-notch point for proper reference framing and contextualization in accordance with the reference-framing process.

9. The medical-device visualization system of claim 1, wherein the plurality of patient-wearable sensors and the field generator in the distal tip of the stylet are magnetic registration elements for the registration process, the field generator in the distal tip of the stylet being a permanent magnet and the plurality of patient-wearable sensors being magnetic sensors configured to detect the permanent magnet.

10. The medical-device visualization system of claim 1, wherein the plurality of patient-wearable sensors and the field generator in the distal tip of the stylet are wireless-communication registration elements for the registration process, the field generator in the distal tip of the stylet being a radiofrequency ("RF") signal emitter and the plurality of patient-wearable sensors being at least RF signal receivers configured to detect RF signals from the RF signal emitter.

11. A method for visualizing an elongate medical device in a body of a patient with a medical-device visualization system, comprising:
instantiating medical-device visualization processes in a console with electronic components and circuitry including memory and one or more processors ("processor[s]") upon execution of executable instructions stored in the memory by the processor(s), the medical-device visualization processes for visualizing the elongate medical device by way of a stylet disposed therein as the elongate medical device is advanced through a vasculature of the patient, and the medical-device visualization processes including:
determining a shape of the stylet in accordance with a shape-sensing process that utilizes shape-sensing logic, the shape of the stylet determined in real-time from reflected optical signals reflected by a plurality of optical sensors distributed along a length of an optical fiber along a length of the stylet;
registering a distal tip of the stylet in accordance with a registration process that utilizes registration logic, the distal tip of the stylet registered in real-time at each sensor of a plurality of patient-wearable sensors configured to sense a field generated by a field generator in at least the distal tip of the stylet; and
placing the stylet with its shape in a patient-based reference frame in accordance with a reference-framing process that utilizes reference-framing logic, the patient-based reference frame established by the plurality of patient-wearable sensors.

12. The method of claim 11, the medical-device visualization processes further including displaying on a display a medical-device representation of the elongate medical device in accordance with a medical-device displaying process that utilizes medical-device displaying logic, the medical-device representation advanced within a patient avatar as the elongate medical device is advanced through the vasculature of the patient.

13. The method of claim 12, wherein the patient avatar represents a superior portion of the patient viewed from an anterior of the patient or a superior end of the patient for visualizing how far or deep the elongate medical device has advanced into the vasculature of the patient.

14. The method of claim 12, wherein the medical-device displaying process further includes displaying patient-wearable-sensor icons over the patient avatar in accordance with the plurality of patient-wearable sensors as placed on the patient, the medical-device representation of the elongate medical device further displayed in relation to the patient-wearable-sensor icons.

15. The method of claim 11, the medical-device visualization processes further including sending input optical signals from an optical interrogator into the optical fiber and receiving by the optical interrogator the reflected optical signals reflected by the plurality of optical sensors in accordance with an optical-fiber interrogation process that utilizes optical-fiber interrogation logic.

16. The method of claim 11, wherein the registration process further includes triangulating the distal tip of the stylet with pairs of the plurality of patient-wearable sensors as the elongate medical device is advanced through the vasculature of the patient.

17. The method of claim 16, wherein triangulating the distal tip of the stylet with the pairs of the plurality of patient-wearable sensors as the elongate medical device is advanced through the vasculature of the patient corrects orientation-type shape-sensing errors that might otherwise occur distal of torsional strains on the optical fiber.

18. The method of claim 11, wherein the plurality of patient-wearable sensors are configured for placement at primary anatomic reference points selected from at least an access point of the elongate medical device, a subclavian-vessel point, and a sternal-notch point for proper reference framing and contextualization in accordance with the reference-framing process.

19. The method of claim 11, wherein the plurality of patient-wearable sensors and the field generator in the distal tip of the stylet are magnetic registration elements for the registration process, the field generator in the distal tip of the stylet being a permanent magnet and the plurality of patient-wearable sensors being magnetic sensors configured to detect the permanent magnet in the registration process.

20. The method of claim 11, wherein the plurality of patient-wearable sensors and the field generator in the distal tip of the stylet are wireless-communication registration elements for the registration process, the field generator in the distal tip of the stylet being a radiofrequency ("RF") signal emitter and the plurality of patient-wearable sensors being at least RF signal receivers configured to detect RF signals from the RF signal emitter in the registration process.

* * * * *